(12) United States Patent
Humphrey et al.

(10) Patent No.: US 10,237,125 B2
(45) Date of Patent: Mar. 19, 2019

(54) DYNAMIC LINE MANAGEMENT SYSTEM

(71) Applicant: BRITISH TELECOMMUNICATIONS PUBLIC LIMITED COMPANY, London (GB)

(72) Inventors: Leslie D Humphrey, London (GB); Ian E Horsley, London (GB); Andrew D Wallace, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 1 day.

(21) Appl. No.: 15/129,121

(22) PCT Filed: Feb. 19, 2015

(86) PCT No.: PCT/GB2015/050475
§ 371 (c)(1),
(2) Date: Sep. 26, 2016

(87) PCT Pub. No.: WO2015/150726
PCT Pub. Date: Oct. 8, 2015

(65) Prior Publication Data
US 2017/0111216 A1   Apr. 20, 2017

(30) Foreign Application Priority Data

Mar. 31, 2014 (EP) .................................. 14250062

(51) Int. Cl.
*H04L 12/24* (2006.01)
*H04B 3/32* (2006.01)
(Continued)

(52) U.S. Cl.
CPC ............... *H04L 41/08* (2013.01); *H04B 3/32* (2013.01); *H04L 12/2801* (2013.01);
(Continued)

(58) Field of Classification Search
CPC .......................................................... H04B 3/32
(Continued)

(56) References Cited

U.S. PATENT DOCUMENTS

2008/0031313 A1   2/2008  Oksman
2009/0041103 A1   2/2009  Shi
(Continued)

FOREIGN PATENT DOCUMENTS

EP   2 023 500 A1   2/2009
EP   2 120 348 A1   11/2009
(Continued)

OTHER PUBLICATIONS

European Search Report dated Sep. 19, 2014 issued in corresponding European Application No. 14250062.8 (6 pgs.).
(Continued)

*Primary Examiner* — Kevin S Mai
(74) *Attorney, Agent, or Firm* — Nixon & Vanderhye PC

(57) ABSTRACT

A method and Dynamic Line Management, DLM, system for controlling Digital Line Subscriber, DSL, connections, comprising applying a first line profile to a DSL connection, the first line profile specifying a first virtual noise template for the DSL connection, wherein the first virtual noise template specifies a first set of frequency dependent virtual noise levels for the DSL connection; configuring a connection parameter (such as the data rate) of the DSL connection based on the first set of frequency dependent virtual noise levels; applying a second line profile to the DSL transceiver unit, the second line profile specifying a second virtual noise template for the DSL connection, wherein the second virtual noise template specifies a second set of frequency dependent virtual noise levels for the DSL connection; and reconfig-
(Continued)

uring the connection parameter for the DSL connection based on the second set of frequency dependent virtual noise levels.

15 Claims, 6 Drawing Sheets

(51) Int. Cl.
*H04M 11/06* (2006.01)
*H04L 12/28* (2006.01)
*H04M 3/30* (2006.01)

(52) U.S. Cl.
CPC ........ *H04L 12/2878* (2013.01); *H04M 3/306* (2013.01); *H04M 11/062* (2013.01)

(58) Field of Classification Search
USPC ........................................................ 709/224
See application file for complete search history.

(56) References Cited

U.S. PATENT DOCUMENTS

| | | | |
|---|---|---|---|
| 2010/0195745 A1 | 8/2010 | Gupta et al. | |
| 2010/0254442 A1* | 10/2010 | Cendrillon | H04B 1/1027 375/220 |
| 2010/0254528 A1 | 10/2010 | Wei et al. | |
| 2012/0294348 A1 | 11/2012 | Kuipers et al. | |
| 2015/0146767 A1* | 5/2015 | Kerpez | H04L 25/03828 375/227 |

FOREIGN PATENT DOCUMENTS

| | | |
|---|---|---|
| EP | 2 369 783 | 9/2011 |
| EP | 2 369 783 A1 | 9/2011 |
| EP | 2 575 261 | 4/2013 |
| EP | 2 575 261 A1 | 4/2013 |

OTHER PUBLICATIONS

Wolkerstorfer, M. et al., "Robust Spectrum Management for DMT-Based Systems", IEEE Transactions on Signal Processing, vol. 58, No. 6, Jun. 2010 (13 pgs.).
Cioffi, J. et al., "Greener Copper with Dynamic Spectrum Management", ICST Institute for Computer Sciences, Social-Informatics and Telecommunications Engineering 2009 (16 pgs.).
Wolkerstorfer, M. et al., "Enabling greener DSL access networks by their stabilization with artificial noise and SNR margin", Cluster Computing, The Journal of Networks, Software Tools and Applications, Apr. 21, 2012 (31 pgs.).
International Search Report for PCT/GB2015/050475, dated Apr. 24, 2015, 2 pages.
International Preliminary Report on Patentability, dated Jul. 8, 2016, 11 pages.

\* cited by examiner ated by the Network Operator by selecting a profile which set a maximum
DYNAMIC LINE MANAGEMENT SYSTEM This application is the U.S. national phase of International Application No. PCT/GB2015/050475 filed 19 Feb. 2015, which designated the U.S. and claims priority to EP Patent Application No. 14250062.8 filed 31 Mar. 2014, the entire contents of each of which are hereby incorporated by reference.

FIELD OF THE INVENTION

The present invention relates to data communication. In particular, this invention relates to controlling Digital Subscriber Line, DSL, connections.

BACKGROUND TO THE INVENTION

Digital Subscriber Lines, DSL, are a common technology for providing digital communication over existing twisted copper pair subscriber lines. The subscriber line extends between two DSL modems. A first DSL modem is typically located in the customer's premises, and the second modem may be located at the local exchange (known as the 'central office' in US terminology), a street cabinet, or distribution point (sometimes known as 'drop point'). Typically, the local exchange, street cabinet or distribution point includes a DSL Access Multiplexer, DSLAM (a form of aggregation transceiver device) comprising several DSL modems (one for each subscriber line). The DSLAM (at the exchange, cabinet or distribution point) connects the first DSL modem at the customer's premises to the Core Network and a Network Management System.

Network Operators employ Dynamic Line Management (DLM) systems to manage the DSL connections. Dynamic Line Management systems select a line profile (also just known as a "profile") which sets constraints on various parameters for a DSL connection (for example, by setting absolute values for some parameters, and maximum and minimum values for others). The Network Operator may have a large number of profiles, each having a different set of parameters. The Network Operator applies the line profile to the DSL connection via the DSLAM.

During a training phase of a DSL connection (i.e. the synchronization phase), the two DSL modems make several measurements on the line and negotiate appropriate values for the parameters (for example, the data rate for the connection, power spectral density, margin, forward error correction parameters and carrier mask). The DSL line then establishes the connection based on the limits set by the profile and these measurements (i.e. the connection uses any absolute values specified by the profile, or a value between the maximum and minimum limits set by the profile based on the line measurements).

Once the training phase is complete, the two modems communicate with each other using these parameters. This normal operational phase is known as "Showtime". If the DSL connection was trained during a low noise period, the DSL connection may have a data rate close to the maximum rate set by the profile. However, if the noise levels on the line subsequently increase, the DSL connection may be subject to a high Bit Error Rate, BER. If the BER increases to an unsustainable level, the line may need to resynchronize (i.e. "retrain") to apply a more appropriate set of parameters (e.g. a lower data rate). These retraining periods are frustrating for the user due to loss of service for several minutes.

Conventionally, this problem was addressed by the Network Operator by selecting a profile which set a maximum limit on the data rate which was well below a maximum sustainable rate on that line (i.e. one which would experience a satisfactory BER even during high noise periods). This technique was known as rate capping, but would result in the data rate on the line being significantly compromised. As an improvement, a technique known as Signal to Noise Ratio, SNR, margin was introduced.

The SNR represents the amount a signal power level exceeds the background noise. The number of bits per channel on the DSL connection (i.e. the "bitloading") is determined according to the SNR for that channel. If the SNR for a majority of channels on the DSL connection is high, then each channel may carry a large number of bits and the DSL connection may support a high data rate. However, if the SNR for a majority of channels is low, then each channel may only carry a relatively low number of bits and the DSL connection may only support a relatively low data rate.

During the training phase, the DSLAM measures the SNR for the line and determines the bitloading for each channel (and the corresponding data rate) based on the measured SNR minus a fixed tone-independent SNR margin (typically 6 dB, acting as a buffer should the noise levels fluctuate). Thus, if the measured SNR during initialization is relatively high (i.e. as the noise levels are low), the DSLAM calculates a correspondingly high data rate based on the measured SNR minus the SNR margin. However, if the SNR on the line subsequently decreases by a greater amount than the applied SNR margin, then the connection cannot sustain the data rate and the line must retrain. The Network Operator may assign a greater SNR margin during the training phase to address this problem, but (as with the rate capping technique), the resulting data rate is compromised.

The concept of Virtual Noise was introduced as an improvement to the SNR margin technique. Virtual Noise is a tone-dependent noise specified by the Network Operator and sent to the DSLAMs. During the training phase, the DSLAM measures the noise for the line, and uses a reference noise (i.e. the greater of either the measured noise on the line or the Virtual Noise) for calculating the bitloading on each tone. An SNR margin may also be applied (although typically much smaller than 6 dB) to compensate for any noise fluctuations. The Network Operators employ various algorithms to estimate a Virtual Noise for the DSL connection, which may include estimating the crosstalk on the line and historical noise data.

The Virtual Noise method was an improvement over the rate capping and SNR margin techniques. However, the existing Virtual Noise estimation algorithms do not accurately reflect the noise levels which may be experienced on the line. Accordingly, if the reference noise for a line during the training phase is a Virtual Noise level that has been estimated too high or too low, the DSLAM may still select an inappropriate data rate for the line.

It is therefore desirable to alleviate some or all of the above problems.

SUMMARY OF THE INVENTION

According to a first aspect of the invention, there is provided a method of controlling a Digital Subscriber Line, DSL, connection between a first and second DSL transceiver unit by an external Dynamic Line Management, DLM, system, the method comprising the steps of: the external DLM system applying a first line profile to a DSL transceiver unit, the first line profile specifying a first virtual noise template for the DSL connection, wherein the first virtual noise template specifies a first set of frequency dependent virtual noise levels for the DSL connection; configuring a parameter for the DSL connection based on the first set of frequency dependent virtual noise levels; the external DLM system applying a second line profile to the DSL transceiver unit, the second line profile specifying a second virtual noise template for the DSL connection, wherein the second virtual noise template specifies a second set of frequency dependent virtual noise levels for the DSL connection; and reconfiguring the parameter for the DSL connection based on the second set of frequency dependent virtual noise levels.

The method of the present invention may therefore reconfigure a connection parameter for a DSL connection based on an updated (and more accurate) virtual noise template. Accordingly, if the initial virtual noise template is set too low (such that, for example, the resulting data rate is set higher than a sustainable rate), the DLM system may subsequently select a new line profile with a more appropriate virtual noise template. The DSL connection may then reconfigure the connection parameter (e.g. by retraining or by On-Line Reconfiguration).

Furthermore, the initial virtual noise template may accurately reflect the noise levels on the line, but the noise levels may change over a period of time. In this situation, the present invention may subsequently adapt the virtual noise template and reconfigure the connection parameter to select more appropriate values for the new noise conditions.

The method may further comprise the initial step of estimating a noise level on a DSL connection, wherein the first virtual noise template for the DSL connection is selected based on the estimated noise level. Thus, the method may initially estimate the noise conditions on the line, and subsequently adapt to a new virtual noise template over time. Furthermore, the first virtual noise template for the DSL connection may be selected based on the estimated noise level and a Signal to Noise Ratio, SNR, margin (providing a further barrier against noise fluctuations).

The steps of adapting the first set of frequency dependent virtual noise levels and reconfiguring the parameter may be triggered due to the SNR margin for the DSL connection being less than a target SNR margin.

The step of adapting the first set of frequency dependent virtual noise levels may be at a first rate when the virtual noise levels are increasing and a second rate when the virtual noise levels are decreasing. The first rate may be faster than the second rate. Thus, the virtual noise levels (and corresponding parameter, e.g. data rate) may quickly adapt to new noise conditions on the line. If the noise levels are increasing, the rate at which the virtual noise levels adapt may be faster (than when the noise levels are decreasing) as there is a risk the line may become unstable if the current data rate is too high for the new noise conditions.

A computer program is also provided comprising computer-executable code which, when executed on a computer, causes the computer to perform the method of the first aspect of the invention.

According to a second aspect of the invention, there is provided a Digital Subscriber Line, DSL, transceiver unit connectable to a DSL connection, the DSL transceiver unit comprising a transceiver adapted to receive a first line profile from an external Dynamic Line Management, DLM, system, the first line profile specifying a first virtual noise template for a DSL connection, wherein the first virtual noise template specifies a first set of frequency dependent virtual noise levels for the DSL connection; and a processor adapted to: configure a parameter for the DSL connection based on the first set of frequency dependent virtual noise levels, wherein the transceiver is further adapted to receive a second line profile from the external DLM system, the second line profile specifying a second virtual noise template for the DSL connection, wherein the second virtual noise template specifies a second set of frequency dependent virtual noise levels for the DSL connection, and the processor is further adapted to: reconfigure the parameter for the DSL connection based on the second set of frequency dependent virtual noise levels.

The processor may be configured to adapt the first set of frequency dependent virtual noise levels and reconfigure the parameter for the DSL connection in response to the SNR margin for the DSL connection being less than a target SNR margin.

The DSL transceiver unit may be part of a DSL Access Multiplexer device. The transceiver unit or DSLAM may be part of an Access Network.

According to a third aspect of the invention, there is provided a Dynamic Line Management, DLM, system for controlling a DSL connection between a first and second transceiver unit, comprising a memory adapted to store a plurality of line profiles, wherein each line profile of the plurality of line profiles specifies a virtual noise template and each virtual noise template includes a set of frequency dependent virtual noise levels; a processor adapted to select a first line profile of the plurality of line profiles for a DSL connection; and a transmitter adapted to send the first line profile to a DSL transceiver unit, wherein the processor is further adapted to subsequently select a second line profile of the plurality of line profiles for the DSL connection and the transmitter is further adapted to send the second line profile to the DSL transceiver unit.

The transmitter may be a transceiver adapted to receive measurement data for the DSL connection, and the processor may be further adapted to estimate noise on the DSL connection from the measurement data and select a first line profile for the DSL connection based on the estimated noise.

BRIEF DESCRIPTION OF THE FIGURES

In order that the present invention may be better understood, embodiments thereof will now be described, by way of example only, with reference to the accompanying drawings in which.

DETAILED DESCRIPTION OF EMBODIMENTS

Figure 1:
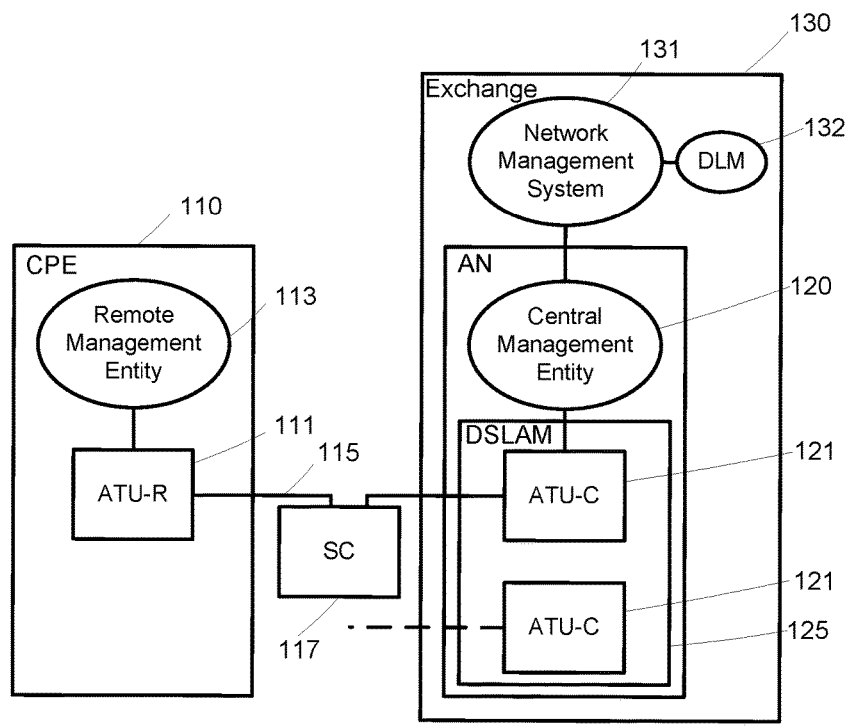
FIG. 1 is a schematic diagram illustrating a first embodiment of a DSL system of the present invention.

A first embodiment of the invention will now be described with reference to FIG. 1. FIG. 1 illustrates a typical DSL system 1 (an ADSL system will be described in the following description, although the skilled reader will understand that it applies to other forms of DSL systems, such as VDSL and VDSL2). The ADSL system 1 includes Customer Premises Equipment (CPE) 110 (shown as a Network Termination box, such as a wireless router). As shown in FIG. 1, the NT box 110 includes an ADSL Transceiver Unit—Remote, ATU-R 111, which is configured to transmit and receive data over subscriber line 115, and includes a modem to modulate and demodulate the data.

The NT box 110 also includes a Remote Management Entity 113, which is configured to control the operations of the NT Box 110. The Remote Management Entity 113 may also be part of the same hardware as the ATU-R.

The NT box 110 is connected to a local exchange 130. In this embodiment, the DSL connection is made along subscriber line 115 and street cabinet 117 (although for some subscribers with a direct connection to their local exchange 130, the street cabinet 117 is not included in this connection). The DSL connection terminates in an Access Node 120 in the local exchange 130 at an ADSL Transceiver Unit—Central Office, ATU-C, 121 which is also configured to transmit and receive data over the subscriber line 115, and includes a modem to modulate and demodulate the data.

The ATU-C 121 is one of several transceiver units disposed in the Access Node 120 in an aggregated transceiver unit. In this embodiment, the aggregated transceiver unit is a DSLAM (DSL Access Multiplexer) 125, which is configured to house and control several ATU-C modems (one for each subscriber line). The Access Node 120 also includes a Central Management Entity, CME, 123 which is configured to control the operations of the ATU-C 121 (typically the Central Management Entity 123 controls the DSLAM 125, which in turn controls each ATU-C 121 for each subscriber line).

Also shown in FIG. 1 is the Network Management System NMS, 131, which is configured to control the operation of several DSL connections via the Central Management Entity 123. The NMS may also control the Remote Management Entity 113 via its connection through subscriber line 115. In modern DSL systems, the DSL connection is controlled by an entity known as the Dynamic Line Management, DLM, system 132. Typically, the DLM system 132 is implemented by the Network Management System 131, but may also be controlled or influenced by the Remote and Central Management Entities 113, 123.

The DLM system 132 may control the operation of a DSL connection by applying a line profile. The line profile specifies a set of properties for the connection, such as absolute values for some parameters and maximum/minimum values for others. The DLM system 132 typically has a plurality of line profiles to choose from, and applies one of these line profiles to the DSL connection via the DSLAM 125. This line profile is used during the synchronization process (a process known as "training").

The training process is used to initialize a line with an appropriate set of properties for the DSL connection. The two modems of ATU-R 111 and ATU-C 121 make several measurements of the line (e.g. of the line noise conditions), and determine an appropriate value for a connection parameter (such as the data rate for the DSL connection) based on these measurements and any specified properties in the line profile. For example, the line profile may specify that the absolute data rate of the connection should be 2 Mbps (a rate capping technique) and, even if the measurements indicate that a higher data rate is achievable, the DSL connection is trained at 2 Mbps. In another example, the line profile may specify the maximum limit of the data rate to be 8 Mbps and, if the measurements indicate that only 6 Mbps is sustainable, the DSL connection is trained at 6 Mbps. Once the training phase is complete, the DSL connection enters a normal operational phase, called "Showtime", using these values for the connection parameters.

The DLM system 132 is configured to implement a method of the present invention. A first embodiment of a method of the present invention will now be described with reference to FIGS. 2 to 3.

Figure 2:
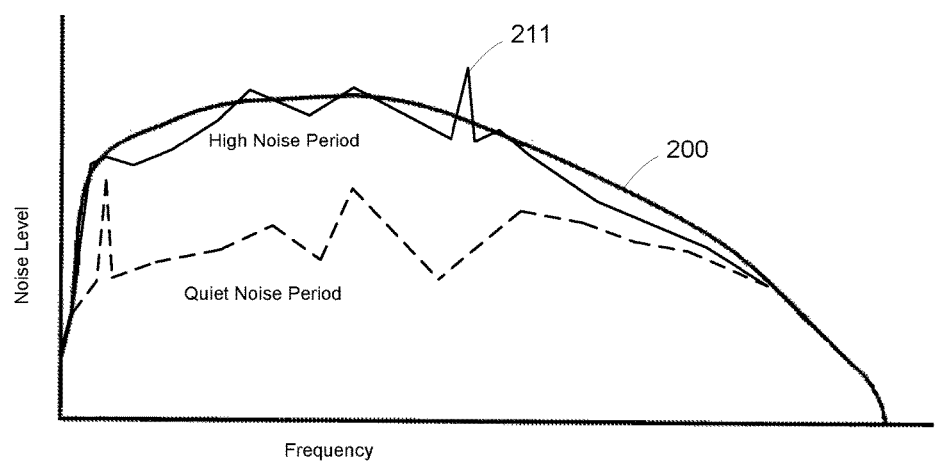
FIG. 2 is a graph illustrating a noise profile of a DSL connection, showing a Virtual Noise template of a first embodiment of a method of the present invention.

FIG. 2 is a graph illustrating the variation of noise level with frequency for a typical DSL connection, showing both low and high noise periods. The DLM system 132 may define a Virtual Noise template 200, which represents a maximum expected noise level for that particular DSL connection at a particular frequency. The Virtual Noise template 200 may be broken up into a set of frequency bands (wherein each frequency band has an associated virtual noise level).

In this embodiment, the DLM system 132 defines a plurality of Virtual Noise templates 200a . . . 200n, wherein each template represents a distinct set of frequency dependent virtual noise levels. The DLM system 132 may therefore create a plurality of line profiles, wherein each profile specifies a distinct Virtual Noise template (among other parameters).

Figure 3:
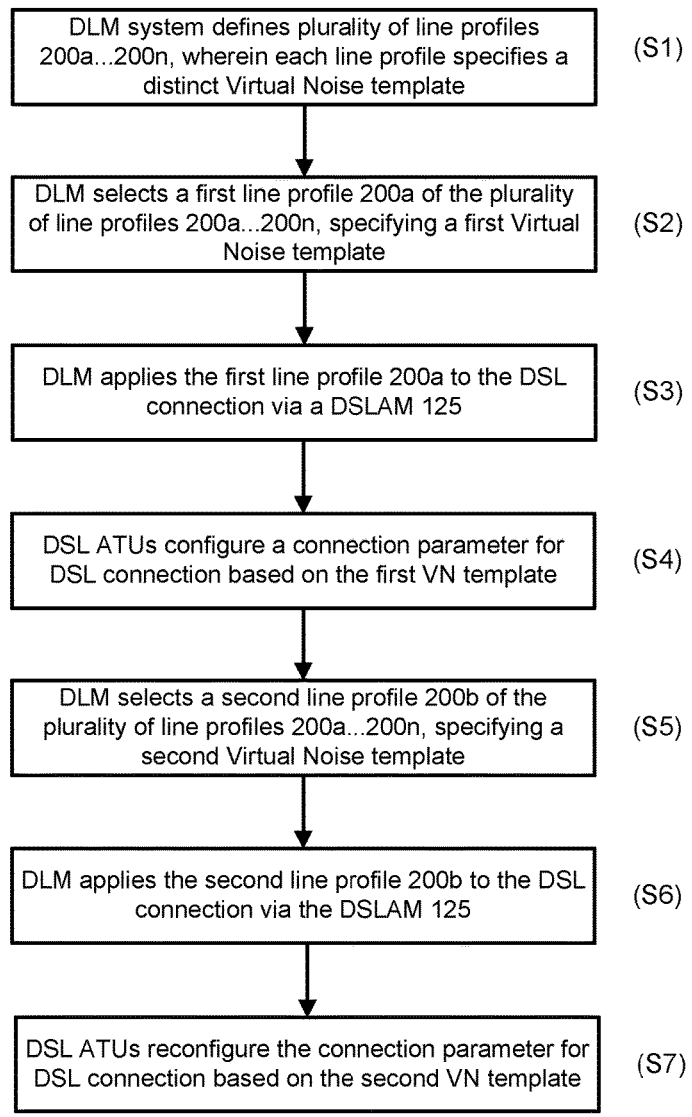
FIG. 3 is a flow diagram illustrating the method of the embodiment of FIG. 2.

FIG. 3 is a flow diagram illustrating the steps implemented by the DLM system 132 in this embodiment. The DLM system 132 defines a plurality of line profiles (step S1), wherein each profile specifies a distinct Virtual Noise template (having a distinct set of frequency dependent virtual noise levels), as described above.

The DLM system 132 selects a first line profile 200a of the plurality of line profiles 200a . . . 200n for a DSL connection (step S2). The objective for the first selection is to select a line profile having a Virtual Noise template which accurately reflects the noise levels to be expected on the line. Accordingly, the DLM system 132 may estimate the noise levels on the DSL connection by analysis of similar lines (e.g. in the same bundle of subscriber lines, or at neighbouring premises), an assumed cable fill (i.e. the likely worst case number of crosstalk disturbers) and copper plant dendricity (i.e. the tendency for crosstalk to be lower than worst case in a dendritic network where pairs for individual customers leave a multi-pair cable at various points along the length of the cable, thus reducing typical crosstalk coupling). The DLM system 132 may also estimate the noise levels on the DSL connection by analysing historical data of retrains, error events and SNR margin excursions.

The DLM system 132 then applies the first line profile 200a to the DSLAM 125 (step S3). During a subsequent training (or retraining) phase, the two modems in transceiver units ATU-R 111 and ATU-C 121 make several measurements on the subscriber line 115 and configure one or more parameters for the DSL connection based on the measurements and the line profile (step S4). For example, transceiver unit ATU-C 121 may define a reference noise level (being the greater of the measured noise level and the Virtual Noise template for the DSL connection), and calculate the bitloading and corresponding data rate for the DSL connection based on this reference noise level.

Subsequently, the DLM system 132 selects a second line profile 200b for the DSL connection (the triggering of this step is explained in more detail below), having a second Virtual Noise template (step S5). The DLM system applies this line profile to the DSL connection via the DSLAM 125 (step S6).

The DSL connection retrains using the second line profile. Accordingly, the ATU-R 111 and ATU-C 121 make several measurements on the subscriber line 115 and configure one or more parameters for the DSL connection based on the measurements and the second line profile (step S7). For example, transceiver unit ATU-C 121 may define a second reference noise level (being the greater of the measured noise level and the second Virtual Noise template for the DSL connection), and calculate the bitloading and corresponding data rate for the DSL connection based on this second reference noise level.

The DSL connection therefore tends to a more appropriate set of connection parameters over time as the DLM system 132 updates the line profile applied to the DSL connection. For example, if the initial data rate is too low (due to the first line profile specifying a Virtual Noise template which was higher than the subsequent noise on the line, and the line was trained during a low noise period such that the reference noise was the Virtual Noise template), the DSL connection will eventually retrain with a more accurate Virtual Noise template and thus a more suitable data rate.

In step S6, the DLM system 132 may select a new line profile for the DSL connection in response to the DSL connection having a high bit error rate. Alternatively, the DLM system 132 may select a new line profile after a certain time period has expired (and the estimate of the line noise on the line becomes more accurate).

In step S7, the DSL connection is retrained using the second line profile such that it may reconfigure its connection parameters (this may be by the DSL connection retraining after being disconnected, or may be forced). However, the skilled person will understand that it is not necessary for the DSL connection to retrain, as the connection parameters may be reconfigured using On-Line Reconfiguration (such as Seamless Rate Adaptation).

The skilled person will understand that the method may be applied to both the upstream and downstream connections. That is, a Virtual Noise level may be defined for both the upstream and downstream transceivers, and the upload and download data rates may be calculated and applied to the DSL connection accordingly.

As shown in FIG. 2, a noise 'spike' (or 'excursion') 211 may occur. This may be caused by unusually high radio frequency activity in the vicinity of the subscriber line, causing the noise levels to rise significantly for a small period of time. As these noise spikes 211 are so infrequent (and therefore only have a negligible influence on the bit error rate), the DLM system 132 does not need to take them into account. Instead, the DLM system 132 may reduce their influence on the bit error rate by bit swapping, for example.

Figure 4:
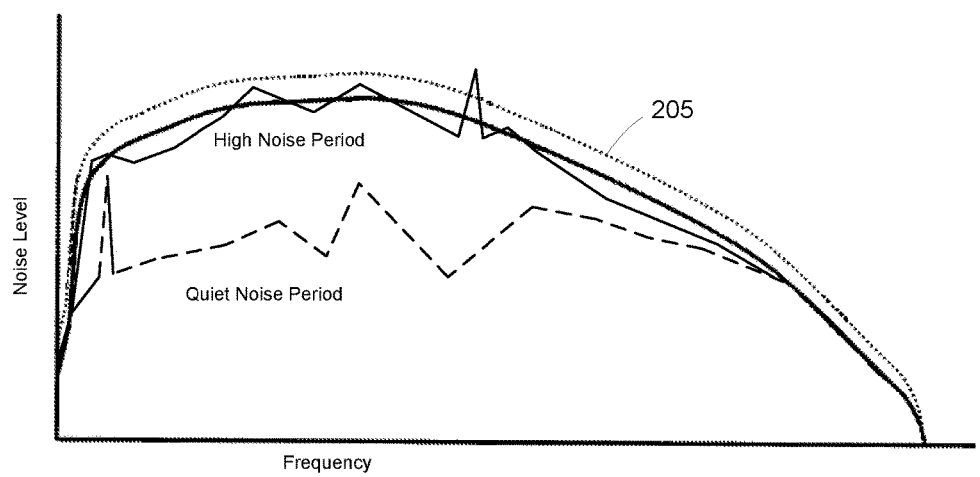
FIG. 4 is a graph illustrating a noise profile of a DSL connection, showing a Virtual Noise and additional margin of a second embodiment of a method of the present invention.

A second embodiment of the method of the present invention will now be described with reference to FIG. 4. The second embodiment is substantially similar to the first embodiment described above. However, in the second embodiment, the DSL connection configures a connection parameter based on a reference noise which is the maximum of the measured noise or the Virtual Noise template, plus an additional noise margin 205. This noise margin 205 provides a buffer in the event the noise is greater than the maximum expected noise level, to further reduce the probability of re-initialization occurring.

Figure 5:
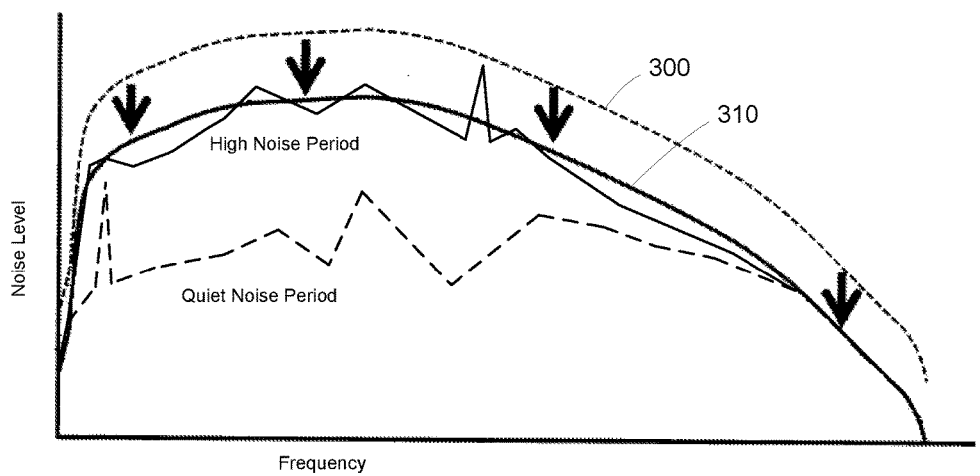
FIG. 5 is a graph illustrating a noise profile of a DSL connection, showing an initial and subsequent Virtual Noise template of a first example of a method of the present invention.

A first example of a method of the present invention will now be described with reference to FIG. 5. The DLM system applies an initial line profile, having a Virtual Noise template 300 which is estimated to be as close as possible to a worst-case scenario on the line, to the DSL connection. The DSL connection then trains up using a first set of measurements on the line and by consulting the initial line profile. However, in this embodiment, the initial line profile includes a Virtual Noise template wherein the estimated noise is higher than necessary, and the line training during a period in which the noise is less than the Virtual Noise template. The first reference noise level for the line is thus the Virtual Noise template, and the data rate for the DSL connection is set based on a Virtual Noise which is higher than necessary. This results in the DSL connection training with a data rate that is lower than an achievable, sustainable data rate.

The noise levels on the DSL connection may be periodically monitored, and, as the estimate for the crosstalk levels and the corresponding Virtual Noise level become more accurate, a second line profile having a second Virtual Noise template 310 (i.e. representing the maximum noise level of the DSL connection more accurately) may be applied to the DSL connection. The DSL connection is then reconfigured with a higher (yet sustainable) data rate. This may be reconfigured on demand (i.e. an enforced retrain) or through On-Line Reconfiguration (e.g. Seamless Rate Adaptation).

Figure 6:
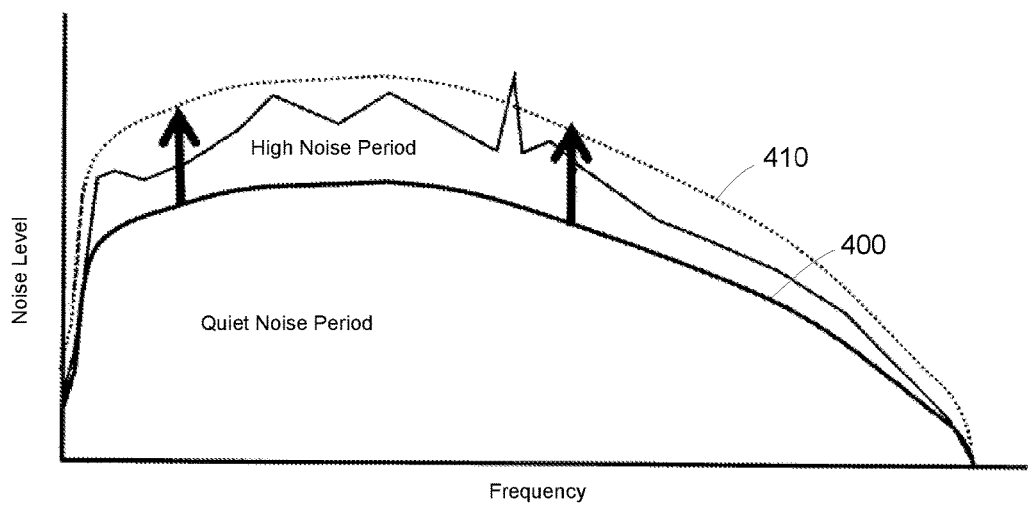
FIG. 6 is a graph illustrating a noise profile of a DSL connection, showing an initial and subsequent Virtual Noise template of a second example of a method of the present invention.

A second example of the method of the present invention will now be described with reference to FIG. 6. This example is similar to the first example above, however, in this embodiment, the initial line profile includes a Virtual Noise template 400 wherein the estimated noise is lower than necessary. This may therefore cause the DSL connection to train with a data rate that is higher than is sustainable, and the DSL connection may experience a high bit error rate or retraining event. The DLM system may then apply a second line profile having a higher Virtual Noise level 410 (i.e. representing the maximum noise level of the DSL connection more accurately) to the DSL connection. The DSL connection is then reconfigured with a lower, but sustainable data rate (e.g. at the next retrain, or by On-Line Reconfiguration).

As shown in the first and second examples above, the present invention provides a technique for adapting the virtual noise templates and applying a more accurate data rate when the estimate of the noise levels on the line changes (i.e. either increases or decreases depending on the initial Virtual Noise template) and more accurate reflects the noise on the line. Furthermore, the skilled person will understand that, even if the initial Virtual Noise template accurately reflects the noise levels on the line at that time, the noise levels may change over time and the present invention provides a method of tracking the changing noise levels and applying a new data rate to the line. The new data rate may therefore be more appropriate for the noise conditions on the line at the time.

The present invention may also adapt the virtual noise levels at a faster rate when the noise levels are increasing on the line than when the noise levels are decreasing. Thus, when the noise levels are increasing (such that there is a risk of the line becoming unstable), the data rate may quickly adapt by the DLM system updating the virtual noise levels to accurately reflect the new noise conditions on the line and a new data rate being applied. The Dynamic Line Management system or the Network Management System may set the rates that the virtual noise levels may adapt, in either increasing or decreasing noise situations.

In the embodiments above, the data rate is used as an example of a connection parameter that may be configured during the training or retraining phases. However, the skilled person will understand that the data rate is just one connection parameter that may benefit from the method of the present invention. For example, the additional margin (used in the second embodiment of the invention), the level of interleaving etc., may also be configured based on the Virtual Noise technique.

In the second embodiment of the invention, the value for the connection parameter is based on the reference noise (being the maximum of the measured noise or the virtual noise template for the DSL connection) plus an additional margin. The skilled person will understand that this margin further reduces the probability of re-initialization events. However, the use of an additional margin is non-essential.

Furthermore, the skilled person will understand that it is non-essential for the DSL connection parameters to be based on a reference noise (being the greater of the measured noise and Virtual Noise template), as it may be based on the Virtual Noise template alone.

In the above embodiments, the DLM system applies a line profile to each DSL connection (which may be applied to each DSL connection by the DSLAM). However, the skilled person will understand that the DLM system may select a line profile for a subset of (e.g. similar) DSL connections, and the DSLAM may apply the line profile to the subset of DSL connections.

The skilled person will understand that the DLM system may be a distinct system from the NMS, or may be embodied on any one of the management entities (e.g. the NMS, the Remote Management Entity or Central Management Entity). Furthermore, the skilled person will understand that the method of the present invention will typically be implemented by a computer program embodied on a tangible computer-readable medium. As all the management entities are in communication with each other, the line profiles and/or values for the connection parameter(s) may be sent to any other entity for implementation.

The above embodiments describe an ADSL system. However, the skilled person will understand that the present invention may be implemented on any form of xDSL system, such as ADSL2, ADSL2+, VDSL, VDSL2 and G.fast. Furthermore, the skilled person will understand that a move to a vectored operation reduces the need to mask large changes in crosstalk by the use of the Virtual Noise technique. However, the method of the present invention may be re-parameterised to transition from non-vectored to vectored operation. For example, as the level of crosstalk on the DSL connection would be relatively low for a vectored line (such that impulse noise and electromagnetic interference would be the main causes of noise), the Virtual Noise templates for these lines may be relatively low compared to a non-vectored line.

Furthermore, in situations in which a bundle of lines has a mixture of vectored and non-vectored lines, the level of crosstalk on each line will be different to bundles having a homogenous arrangement. As Network Operators gradually transition the lines to vectored operation (such that the crosstalk levels change), the present invention may tend to a more accurate Virtual Noise profile as the noise levels in the bundle change.

The skilled person will understand that any combination of features is possible within the scope of the present invention, as claimed.

The invention claimed is:

1. A method of controlling a Digital Subscriber Line, DSL, connection between a first and second DSL transceiver unit by an external Dynamic Line Management, DLM, system, the method comprising the steps of:
the external DLM system applying a first line profile to a DSL transceiver unit, the first line profile specifying a first virtual noise template for the DSL connection, wherein the first virtual noise template specifies a first set of frequency dependent virtual noise levels for the DSL connection;
configuring a parameter for the DSL connection based on the first set of frequency dependent virtual noise levels;
the external DLM system applying a second line profile to the DSL transceiver unit, the second line profile specifying a second virtual noise template for the DSL connection, wherein the second virtual noise template specifies a second set of frequency dependent virtual noise levels for the DSL connection which is distinct to the first set of frequency dependent virtual noise levels; and
reconfiguring the parameter for the DSL connection based on the second set of frequency dependent virtual noise levels.

2. A method as claimed in claim 1, further comprising the initial step of:
estimating a noise level on a DSL connection, wherein the first virtual noise template for the DSL connection is selected based on the estimated noise level.

3. A method as claimed in claim 2, wherein the first virtual noise template for the DSL connection is selected based on the estimated noise level and a Signal to Noise Ratio, SNR, margin.

4. A method as claimed in claim 1, wherein the steps of applying the second line profile and reconfiguring the parameter is triggered due to the SNR margin for the DSL connection being less than a target SNR margin.

5. A method as claimed in claim 1, wherein the step of applying the second line profile is at a first rate when the virtual noise levels are increasing and a second rate when the virtual noise levels are decreasing.

6. A method as claimed in claim 5, wherein the first rate is faster than the second rate.

7. A non-transitory computer-readable storage medium storing a computer program comprising computer-executable code which, when executed on a computer, causes the computer to perform the method as claimed in claim 1.

8. A Digital Subscriber Line, DSL, transceiver unit connectable to a DSL connection, the DSL transceiver unit comprising
a transceiver adapted to receive a first line profile from an external Dynamic Line Management, DLM, system, the first line profile specifying a first virtual noise template for a DSL connection, wherein the first virtual noise template specifies a first set of frequency dependent virtual noise levels for the DSL connection; and
a processor adapted to:
configure a parameter for the DSL connection based on the first set of frequency dependent virtual noise levels,
wherein the transceiver is further adapted to receive a second line profile from the external DLM system, the second line profile specifying a second virtual noise template for the DSL connection, wherein the second virtual noise template specifies a second set of frequency dependent virtual noise levels for the DSL connection which is distinct to the first set of frequency dependent virtual noise levels, and
the processor is further adapted to:
reconfigure the parameter for the DSL connection based on the second set of frequency dependent virtual noise levels.

9. A DSL transceiver unit as claimed in claim 8, wherein the processor is configured to adapt the first set of frequency dependent virtual noise levels and reconfigure the parameter for the DSL connection in response to the SNR margin for the DSL connection being less than a target SNR margin.

10. A DSL transceiver unit as claimed in claim 8, wherein the processor is adapted to reconfigure the parameter for the DSL connection based on the second set of frequency dependent virtual noise levels at a first rate when the virtual noise levels are increasing and a second rate when the virtual noise levels are decreasing.

11. A DSL transceiver unit as claimed in claim 10, wherein the first rate is faster than the second rate.

12. A DSL Access Multiplexer device including a DSL transceiver unit as claimed in claim 8.

13. An Access Network including a device as claimed in claim 8.

14. A Dynamic Line Management, DLM, system for controlling a DSL connection between a first and second transceiver unit, comprising
   a memory adapted to store a plurality of line profiles, wherein each line profile of the plurality of line profiles specifies a virtual noise template and each virtual noise template includes a distinct set of frequency dependent virtual noise levels;
   a processor adapted to select a first line profile of the plurality of line profiles for a DSL connection; and
   a transmitter adapted to send the first line profile to a DSL transceiver unit, wherein the processor is further adapted to subsequently select a second line profile of the plurality of line profiles for the DSL connection and the transmitter is further adapted to send the second line profile to the DSL transceiver unit.

15. A DLM system as claimed in claim 14, wherein the transmitter is a transceiver adapted to receive measurement data for the DSL connection, and the processor is further adapted to estimate noise on the DSL connection from the measurement data and select a first line profile for the DSL connection based on the estimated noise.

* * * * *